(12) United States Patent
Tian et al.

(10) Patent No.: US 9,279,063 B2
(45) Date of Patent: *Mar. 8, 2016

(54) POLYESTER BINDER FOR FLOORING PRODUCTS

(71) Applicant: Armstrong World Industries, Inc., Lancaster, PA (US)

(72) Inventors: Dong Tian, Lancaster, PA (US); Gary A. Sigel, Millersville, PA (US); Fang Qiao, Lancaster, PA (US); Rebecca L. Winey, Lancaster, PA (US); Jeffrey S. Ross, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,873

(22) Filed: Nov. 8, 2013

(65) Prior Publication Data

US 2014/0135434 A1  May 15, 2014

Related U.S. Application Data

(63) Continuation of application No. 11/542,019, filed on Oct. 2, 2006, now abandoned.

(51) Int. Cl.
| | | |
|---|---|---|
| C09D 167/02 | (2006.01) | |
| C09D 7/12 | (2006.01) | |
| C08L 67/02 | (2006.01) | |
| C08K 5/1515 | (2006.01) | |

(52) U.S. Cl.
CPC .............. *C09D 167/02* (2013.01); *C08L 67/02* (2013.01); *C09D 7/1216* (2013.01); *C09D 7/1233* (2013.01); *C08K 5/1515* (2013.01)

(58) Field of Classification Search
CPC .... C08L 67/02; C08L 2666/18; C09D 167/02
USPC ........................................................ 525/444
See application file for complete search history.

(56) References Cited

U.S. PATENT DOCUMENTS

| | | | |
|---|---|---|---|
| 2,625,526 A * | 1/1953 | Sparks et al. ................. | 525/169 |
| 2,851,436 A | 9/1958 | Forsythe | |
| 2,891,930 A | 6/1959 | Caldwell et al. | |
| 3,575,785 A | 4/1971 | Hedrick et al. | |
| 3,616,144 A | 10/1971 | Kenney | |
| 3,718,715 A | 2/1973 | Crawford et al. | |
| 3,972,962 A | 8/1976 | Williams et al. | |
| 3,991,005 A | 11/1976 | Wallace | |
| 4,011,358 A * | 3/1977 | Roelofs ......................... | 428/516 |
| 4,083,824 A | 4/1978 | Harris | |
| 4,362,775 A | 12/1982 | Yabe et al. | |
| 4,400,468 A * | 8/1983 | Faber ............................ | 435/142 |
| 4,595,626 A | 6/1986 | Brubaker et al. | |
| 4,614,556 A | 9/1986 | Fry et al. | |
| 4,820,763 A | 4/1989 | Yang | |
| 5,244,942 A | 9/1993 | Hover et al. | |
| 5,276,082 A | 1/1994 | Forry et al. | |
| 5,340,846 A | 8/1994 | Rotter et al. | |
| 5,349,028 A | 9/1994 | Takahashi et al. | |
| 5,391,612 A | 2/1995 | Johnson | |
| 5,407,617 A | 4/1995 | Oppermann et al. | |
| 5,494,707 A | 2/1996 | Wang et al. | |
| 5,576,367 A | 11/1996 | O'Brien et al. | |
| 5,700,865 A | 12/1997 | Lundquist | |
| 5,728,476 A | 3/1998 | Harwood et al. | |
| 5,753,767 A | 5/1998 | Ward | |
| 5,763,501 A | 6/1998 | Bickhardt et al. | |
| 5,798,413 A | 8/1998 | Spelthann et al. | |
| 5,824,727 A | 10/1998 | Blomkvist et al. | |
| 5,928,754 A | 7/1999 | Kondo et al. | |
| 5,945,472 A | 8/1999 | Duong et al. | |
| 5,997,782 A | 12/1999 | Kopf et al. | |
| 6,017,586 A | 1/2000 | Payn et al. | |
| 6,063,465 A * | 5/2000 | Charbonneau et al. .... | 428/36.92 |
| 6,103,803 A | 8/2000 | Cheung et al. | |
| 6,187,424 B1 | 2/2001 | Kjellqvist et al. | |
| 6,214,924 B1 | 4/2001 | Bieser et al. | |
| 6,224,804 B1 | 5/2001 | Schwonke et al. | |
| 6,254,956 B1 | 7/2001 | Kjellqvist et al. | |
| 6,287,706 B1 | 9/2001 | Simpson et al. | |

(Continued)

FOREIGN PATENT DOCUMENTS

| | | |
|---|---|---|
| EP | 0848037 | 6/1996 |
| EP | 0721829 | 7/1996 |
| EP | 0861951 | 9/1998 |
| EP | 0974611 | 1/2000 |
| JP | 63270812 | 11/1988 |
| WO | 9415014 | 7/1994 |
| WO | 9421721 | 9/1994 |
| WO | 9517568 | 6/1995 |
| WO | 2004069920 | 8/2004 |

OTHER PUBLICATIONS

Standard Specification for Vinyl Composition Floor Tile (1), ASTM International, Designation: F 1066-04, Published Sep. 2004, pp. 770-774.

(Continued)

*Primary Examiner* — Mike M Dollinger

(74) *Attorney, Agent, or Firm* — Christina W. Geerlof

(57) ABSTRACT

A flooring product is provided comprising at least one layer including a polymeric binder comprising at least one thermoplastic polyester resin, wherein the polyester resin comprises at least one renewable component. A flooring product is also provided that includes at least one layer comprising filler and at least one thermoplastic, high molecular weight polyester resin. The flooring product may also qualify for at least one point under the LEED System. A composition is also provided that can be melt mixed in low intensity mixers and processed into flooring layers.

18 Claims, No Drawings

(56) References Cited

U.S. PATENT DOCUMENTS

| | | | |
|---|---|---|---|
| 6,291,725 B1 * | 9/2001 | Chopade et al. | 568/861 |
| 6,356,658 B1 | 3/2002 | Sezan et al. | |
| 6,380,296 B1 | 4/2002 | Inada et al. | |
| 6,573,340 B1 | 6/2003 | Khemani et al. | |
| 6,617,008 B1 | 9/2003 | Kono et al. | |
| 6,656,577 B1 * | 12/2003 | Adelman et al. | 428/221 |
| 6,727,342 B1 * | 4/2004 | Bastioli et al. | 528/272 |
| 6,730,709 B2 | 5/2004 | Itoh et al. | |
| 6,869,985 B2 | 3/2005 | Mohanty et al. | |
| 6,911,263 B2 | 6/2005 | Kauffman et al. | |
| 6,921,791 B2 | 7/2005 | Lenox et al. | |
| 7,029,750 B2 | 4/2006 | Takei et al. | |
| 8,551,604 B2 * | 10/2013 | Winey et al. | 428/195.1 |
| 2002/0132960 A1 | 9/2002 | Haile et al. | |
| 2002/0136851 A1 * | 9/2002 | Kollaja et al. | 428/40.1 |
| 2002/0143083 A1 | 10/2002 | Korney | |
| 2004/0010073 A1 * | 1/2004 | Shiga et al. | 524/539 |
| 2004/0013833 A1 * | 1/2004 | Lee et al. | 428/35.7 |
| 2005/0013982 A1 * | 1/2005 | Burgueno et al. | 428/292.1 |
| 2005/0042736 A1 | 2/2005 | San et al. | |
| 2005/0048277 A1 | 3/2005 | Oshilaja et al. | |
| 2005/0079780 A1 | 4/2005 | Rowe et al. | |
| 2005/0136259 A1 * | 6/2005 | Mohanty et al. | 428/409 |
| 2005/0137332 A1 * | 6/2005 | Hale et al. | 525/66 |
| 2005/0137921 A1 * | 6/2005 | Shahriari | 705/7 |
| 2005/0164023 A1 * | 7/2005 | Davis et al. | 428/480 |
| 2006/0093826 A1 | 5/2006 | Koeniger et al. | |
| 2006/0106167 A1 | 5/2006 | Shah | |
| 2006/0148969 A1 * | 7/2006 | Tanaka et al. | 524/502 |
| 2013/0230729 A1 * | 9/2013 | Tian et al. | 428/425.1 |
| 2014/0039111 A1 * | 2/2014 | Winey et al. | 524/425 |
| 2014/0135434 A1 * | 5/2014 | Tian et al. | 524/114 |

OTHER PUBLICATIONS

Ramani Narayan; Biobased & Biodegradable Polymer Materials: Rationale, Drivers, and Technology Exemplars, Presented at the National American Chemical Society, Division of Polymer Chemistry Meeting, San Diego (2005); ACS Symposium Ser (An American Chemical Publication) 939, Jun. 2006.

Mark, Herman, et el., eds. Encyclopedia of Polymer Science and Engineering, 2nd ed., Polyurethanes; vol. 12, pp. 1-9. J. Wiley & Sons; New York, NY. 1985.

Joseph V. Kurian, Journal of Polymers and the Environment, A New Polymer Platform for the Future—Sorona® from Com Derived 1,3-Propanedoil, pp. 159-176, issue vol. 13, No. 2/ Apr. 2005.

Sherry Heidary and Bernard Gordon III; Hydrolyzable Poly(ethylene terephthalate), Journal of Environmental Polymer Degradation, vol. 2, No. 1, 1994, pp. 19-26.

\* cited by examiner

POLYESTER BINDER FOR FLOORING PRODUCTS

CROSS-REFERENCE TO RELATED PATENT APPLICATIONS

The present application is a continuation of U.S. patent application Ser. No. 11/542,019 filed Oct. 2, 2006, which is hereby incorporated herein by reference in its entirety.

FIELD OF THE INVENTION

The present invention relates generally to the field of floor products. More particularly, the present invention relates to floor products having a layer including a polyester resin binder and the composition used to make the polyester resin binder layer. As used herein a polyester resin is a polycondensation product of polycarboxylic acids or esters with polyhydroxy alcohols, and are generally hydroxy-terminated, acid terminated or end-cap terminated, i.e. capped with a less reactive moiety.

BACKGROUND OF THE INVENTION

The development of resilient flooring products (i.e. non-textile) based on polymers besides polyvinyl chloride (PVC) has been an objective for a long time. For example, acrylic polymers have been disclosed as a binder for flooring products. U.S. Pat. No. 3,575,785 discloses a flooring product comprising poly alkyl methacrylate binder. World Patent Application WO 1994/9415014A1 discloses a floor tile having a binder comprising ethylene butylacrylate copolymer. WO 94/21721 discloses flooring having a wear layer comprised of plasticized acrylic polymers.

Ethylene vinyl acetate (EVA) co-polymers have also been disclosed as a binder for flooring products. For example, U.S. Pat. No. 5,244,942 discloses flooring having an EVA binder and filler. The composition may also contain polypropylene or ethylene-propylene diene monomer (EPDM) polymers as additives. U.S. Pat. Nos. 5,928,754; 6,380,296; 5,407,617; 4,614,556; and EP 0,721,829B1 disclose the use of EVA as a binder in flooring products. U.S. Pat. No. 5,276,082 discloses the use of silane-grafted EVA as a flooring binder.

Functionalized polyolefins such as ethylene acrylic acid co-polymers and their partially neutralized counterparts (ionomers) have also been disclosed as a binder for flooring products. For example, U.S. Pat. No. 4,083,824 discloses a non-vinyl flooring composition comprising (1) a copoly block acrylate comprising at least two $C_1$ to $C_8$ linear or branched alkyl acrylates of Mw from about 100,000 to about 300,000 and further characterized by at least two glass transition temperatures, one being above 25.degree. C., the other being below 25.degree. C.; and (2) a random ionic copolymer comprising ethylene and 2.5% to 25% by weight acrylic acid or methacrylic acid partially neutralized by a monovalent or polyvalent metal ion, said ionic copolymer having a melt index of 0.1 to 1000 grams per minute.

U.S. Pat. No. 5,391,612 discloses a flooring product comprising ethylene acrylic acid (EAA) or ethylene methacrylic acid (EMA) copolymers as binders for flooring products.

US Patent Application No. 2005/0048277 discloses a non-vinyl flooring including a binder having a terpolymer comprising ethylene, methyl acrylate and acrylic acid and a copolymer comprising ethylene and methacrylic acid. The non-vinyl flooring may be either a resilient non-vinyl floor tile or a resilient non-vinyl sheet flooring comprising the non-vinyl terpolymer and a copolymer.

U.S. Pat. Nos. 5,728,476; 5,753,767; 5,798,413; 6,921,791; and EP 0,848,037; and WO Application 2004/069920A1 also disclose the use of acid functionalized or ionomer polymers as binders in flooring, product.

Polyolefin materials have also been disclosed as binders for flooring products. Recent advances in metallocene catalysts have provided new polyolefin materials of interest. Polyolefin binders are disclosed in the following patents: U.S. Pat. Nos. 6,103,803; 6,254,956; 6,356,658; 6,224,804; 5,763,501; 6,287,706; 6,017,586; 5,945,472; 6,187,424; 6,214,924; 5,700,865; 6,617,008; 5,997,782; 5,928,754; 5,824,727; and EP 0,861,951B1.

Aromatic esters and some low molecular weight polyesters have been traditionally used as plasticizers for PVC. U.S. Pat. No. 4,595,626 discloses unsaturated, cross-linkable unsaturated polyesters resins as flooring binders. The end group analysis molecular weight of the polyester is between 600 and 3600. The composition also comprises reactive monomer diluent.

PCT Application WO 95/17568 discloses a wear surface for flooring comprising a thermoset polyester resin and an epoxy or carboxyl-functional acrylic resin and a cross-linking agent. Additionally, U.S. Pat. No. 6,911,263 discloses a wear surface for flooring comprising a composite of PET (polyethylene terephthalate) clear film and a sol gel type surface coating.

Most recently, interest in polylactic acid based polyesters (PLA) has increased since the polymer can be obtained from natural resources and bio-processes. This has given rise to a large number of patents based upon these materials and other alpha-hydroxy acid based polyesters. Due to the polymer structure, these PLA polyesters require the use of plasticizers or other polymer additives for processing and to produce products having acceptable properties. For example, see U.S. Pat. Nos. 6,869,985 and 7,029,750, and US Patent Application No. 2005/0136259 which disclose compositions comprising PLA as a binder component for flooring.

Although there is a still controversy over the manufacture, use, and disposal of polyvinyl chloride, only recently have commercial efforts been made to develop materials and polymers from renewable resources. For example, DuPont's new Sorona fiber comprises a polyester made from terephthalic acid and Bio-produced 1,3-propanediol.

Recently, the US Green Building Council has established the LEED (Leadership in Energy and Environmental Design) system for scoring points for new commercial construction (Table 1). Under the LEED system, flooring can be used to obtain points if it contains 10% by weight or more of post-industrial recycle material.

TABLE 1

| LEED System for New Commercial Construction | | | |
|---|---|---|---|
| Rating System | LEED-NC Version 2.1 | Rating System | LEED-EB Version 2.0 |
| MR Credit 4.1 1 point | 5% wt = (post-consumer + ½ post-industrial) | MR Credit 2.1 1 point | 10% (Post-consumer materials), or 20% (Post-industrial materials) |
| MR Credit 4.2 1 point | 10% wt = (post-consumer + ½ post-industrial) | | |

TABLE 1-continued

LEED System for New Commercial Construction

| Rating System | LEED-NC Version 2.1 | Rating System | LEED-EB Version 2.0 |
|---|---|---|---|
| MR Credit 6 1 Point | 5% wt = (rapidly renewable building materials and products) | MR Credit 2.5 1 point | 50% (Rapidly renewable materials) |

NC: New Construction;
EB: Existing Building; Minimum % wt for each point. The % for both NC and EB is weight percent. For NC 1 point is granted for at least 5% wt of the total of post-consumer and ½ post-industrial. A second point is granted for at least 10% wt of the total of post-consumer and ½ post-industrial. An additional point is granted for at least 5% wt of rapidly renewable building materials and products.
For EB 1 point is granted for at least 10% wt post-consumer materials. A second point is granted for at least 20% wt of post-industrial materials. An additional point is granted for at least 50% wt of rapidly renewable materials.

There has been renewed market interest in giving preference to "greener" flooring, products based upon this LEED System. The use of renewable materials is of high interest.

There continues to be a need for flooring products having a polymeric binder that comprises components obtained from renewable resources. Additionally, there is a need for such a new binder system to be compatible with existing processes and equipment currently utilized for vinyl flooring manufacturing.

SUMMARY OF THE INVENTION

The resilient flooring product of the present invention has at least one layer including a polymeric binder comprising thermoplastic, polyester resin, wherein the polyester comprises at least one renewable component. As used in this disclosure, "thermoplastic" means a polymer that softens when exposed to heat and returns to its original condition when cooled to room temperature, whereas "thermoset" means a polymer that solidifies or sets irreversibly when heated. Thermoset is usually associated with a cross-linking reaction of the molecular constituents induced by heat or radiation.

In some embodiments, the thermoplastic, polyester resin has a number average molecular weight (Mn) of at least 5,000 and in other embodiments the polyester resins have a molecular weight (Mn) of at least 10,000.

The polyester may be biodegradable, and/or may contain renewable components. In one embodiment, the polyester comprises at least 50% by weight renewable components. In another embodiment, the polyester comprises greater than 80% by weight renewable components. In another embodiment, the polyester comprises recycle components. In yet another embodiment, the polyester comprises essentially 100% renewable and recycle components.

The polyesters may comprise aliphatic diacid and aliphatic diol components. In one embodiment, these components come from renewable sources. In other embodiments, the polyester can comprise aromatic diacids and aliphatic dial components. In other embodiments, the polyester can comprise aliphatic diacids, aromatic diacid, and aliphatic diol components. The polyesters can be amorphous or crystalline in nature. In one embodiment the polyester is amorphous having a Tg at about room temperature. In other embodiments, the polyester may be crystalline and have a Tg at or below about 25° C. and a melt temperature (Tm) above about 25° C. In some embodiments, the Tm is above about 25° C. but below about 200° C. In yet another embodiment, the polyester may comprise branching.

In another embodiment, the polyester comprises the co-reaction product of a aliphatic polyester comprising renewable components and a recycle polyester resin. In some embodiments, the recycle polyester resin is aromatic based and includes polyethylene terephthlate, polybutylene terephthlate, and polypropylene terephthlate.

In another embodiment, a flooring product is provided having at least one layer including filler and a polymeric binder comprising at least one polyester resin In another embodiment, a flooring product is provided that qualifies for at least one point in the LEED System and has at least one layer including a polymeric binder comprising a high molecular weight polyester resin.

In another embodiment, a floor tile having a VCT type structure where a thermoplastic polyester resin is substituted for the PVC. In other embodiments, the floor tile comprises renewable components, and/or recycle components. In one such embodiment, the polyester resin comprises the co-reaction product of a renewable polyester resin and a recycle polyester resin. The floor tile may also qualify for at least one point in the LEED System.

In another embodiment, a composition is provided having filler and a polymeric binder comprising at least one thermoplastic, high molecular weight polyester resin, wherein the composition may be melt mixed in a low intensity mixer and processed into a flooring layer.

DETAILED DESCRIPTION OF THE INVENTION

This invention provides a flooring product having at least one layer including a polymeric binder comprising thermoplastic polyester resin, wherein the polyester resin comprises at least one renewable component. The flooring product can comprise sheet or tile product structures. At least one layer in these structures may be solid or foamed, and filled or unfilled. In some embodiments, at least one layer comprises a transparent wear layer or wear layer component. Another example is similar to a vinyl composition tile (VCT), as described by ASTM Specification 1066-04. As used herein a polyester composition tile (KT) is similar to a VCT except a polyester resin is substituted for the PVC. While the present invention is intended for use in such type tile, the invention is also directed to various other types of flooring, including tile type products such as Type III solid vinyl tile, surface applied tile, and to various sheet flooring products, wherein a polyester resin is substituted for the PVC. In one embodiment, at least one layer may comprise consolidated chips/particles having a binder comprising thermoplastic polyester resin, in another embodiment, at least one layer may be a homogeneous, melt processed layer having a binder comprising thermoplastic polyester resin. In yet another embodiment, the flooring product comprises renewable and recycle components that qualify the product for at least one point under the LEED System.

Unless at least one layer is transparent, it typically comprises a filler in addition to the polymeric binder. Limestone, talc, or other minerals are utilized as filler in flooring. Interest in using recycle materials as fillers has increased due to "green" issues. Such recycle filler materials include those obtained from wood or plants. These include pecan shells, wood flour, saw dust, walnut shells, rice hulls, corn cob grit, and others. Additionally, ground shells from animals such as clams and coral are renewable inorganic fillers. Such renewable fillers contain biobased carbon in the form of carbonates. These can be considered post-industrial or renewable materials.

Mineral fillers generated from post-industrial processes include limestone, quartz, ceramic powders, glass, fly ash, and concrete powder.

Recycle thermoset resin based fillers can also be employed. For example, powders produced by grinding thermoset polyester materials, such as products made from bulk molding compounds (BMC) or sheet molding compounds (SMC) can be post-industrial, as well as post-consumer materials. Another thermoset material of interest is recycled fillers made from Urea Formaldehyde thermoset resins. Depending upon the source, these materials can also be post-industrial or post-consumer. Another example includes ground, cured (crosslinked) rubber materials such as used in tires. These rubbers materials can be based on natural or synthetic rubbers, polyurethanes, or other well known thermoset rubber compositions.

Additionally, recycled thermoplastic resin based materials may be employed as fillers if they are incompatible with the polyester binder. For example, polyethylene (PE), polypropylene, polyamide, polyester, polystyrene, polycarbonate acrylonitrile butadiene styrene, and thermoplastic rubbers maybe incompatible with the high molecular weight polyester binder. Such materials, if added as particulate will essentially function as fillers in these compositions. If the recycled thermoplastic resin is compatible with the binder, it may function as a binder and not as a filler in the composition. DuPont "Sarrona" Bio-PDO based carpet fiber may be recycled and would be a filler or binder depending upon compatibility with the binder. Compatibility may be dependent upon the processing conditions employed. Depending upon the source, these materials can be post-industrial or post-consumer.

In one embodiment, the thermoplastic, polyester resin is high molecular weight and has a number average molecular weight (Mn) of at least 5,000 and in some embodiments the polyester resins have a molecular weight (Mn) of at least 10,000. The polyesters may be biodegradable, and/or may contain renewable components. In one embodiment, the polyester comprises at least 50% by weight renewable components. In another embodiment, the polyester comprises greater than 80% by weight renewable components. In yet another embodiment, the polyester comprises essentially 100% renewable and recycle components.

In one embodiment, the polyester resin may comprise aliphatic diacid and aliphatic diol components. Although a wide range of aliphatic diacids and aliphatic diols may be used, these components may come from renewable sources. Renewable aliphatic diacid and aliphatic dial components may include but are not limited to Bio-PDO (1,3-propanediol), 1,4-butanediol, sebacic acid, succinic acid, adipic acid, azelaic acid, glycerin, and citric acid. These materials may also be modified by reaction with epoxidized soybean, epoxidized linseed oil, or other natural oils.

The polyesters may be pre-reacted with epoxidized natural oils, or the reaction can occur during the melt processing into flooring layers. Such reaction during melt processing is a type of dynamic vulcanization. Dynamic vulcanization is the process of intimate melt mixing of two or more reactive components, such as an acid-terminated polyester and epoxidized natural oil, and the reaction occurs between at least two of these components during the melt mixing.

Other diacid and diol components from renewable resources will become available as the need for renewable materials continues to grow. The diol components may also include diols which are branched or hindered to limit crystallinity in the final polyester binder. These can include neopentyl glycol, glycerin, and others.

Renewable components based on plants, animals, or biomass processes have a different radioactive $C^{14}$ signature than those produced from petroleum. These renewable, biobased materials have carbon that comes from contemporary (non-fossil) biological sources. A more detailed description of biobased materials is described in a paper by Ramani Narayan, "Biobased & Biodegradable Polymer Materials: Rationale, Drivers, and Technology Exemplars", presented at American Chemical Society Symposium, San Diego 2005; American Chemical Society Publication #939, June 2006. The Biobased Content is defined as the amount of biobased carbon in the material or product as fraction weight (mass) or percent weight (mass) of the total organic carbon in the material or product. ASTM D6866 (2005) describes a test method for determining Biobased Content. Theoretical Biobased Content was calculated for the resultant polyester resins in Table 2 and Table 3.

In one embodiment, the Biobased Content is at least 20% by weight. In another embodiment, the Biobased content is at least 50% by weight. In still another embodiment, the Biobased content is at least 75% by weight. The higher the Biobased Content the "greener" the product. The Biobased Content may be at least 25% by weight or at least 10% by weight or at least 5% by weight, particularly when the polyester resin is a blend of two or more resins.

In another embodiment, the thermoplastic polyester resin can comprise aromatic diacid components and aliphatic diol components. The aromatic acid components may include but are not limited to phthalic acid (anhydride), isophthalic, or terephthalic acids. In some cases an amount of trimellitic anhydride can also be used.

In another embodiment, the thermoplastic polyester resin may comprise aliphatic diacid and aromatic diacid components reacted with various aliphatic diols.

The thermoplastic polyester resin may also be branched. For example, utilizing; aliphatic alcohols that have more than two functional groups, such as glycerin, or aromatic acids having more than two functional groups such as trimellitic anhydride may be used to produce branched polyesters.

Although, the above diacid components are described, it is understood that their simple diesters such as from methanol or ethanol can be used to prepare the thermoplastic polyester resin via known transesterification techniques.

Depending upon the diacid and diol selected, the polyester resin can be amorphous or crystalline/semi-crystalline materials. In one embodiment, the polyester resin is amorphous. Table 2 shows some examples of amorphous polyester resins of the invention and their % by weight renewable components.

TABLE 2

Compositions of Amorphous Polyesters With Renewable Content

| Ingredient | EX-1 Amt (g) | EX-2 Amt (g) | EX-3 Amt (g) | EX-4 Amt (g) | EX-5 Amt (g) | EX-6 Amt (g) |
|---|---|---|---|---|---|---|
| 1,3-propanediol | 367.60 | 380.88 | 381.80 | 372.21 | 370.19 | 357.64 |
| Isophthalic acid | 545.99 | 232.94 | 233.50 | 292.68 | 291.08 | 218.72 |

TABLE 2-continued

Compositions of Amorphous Polyesters With Renewable Content

| Ingredient | EX-1 Amt (g) | EX-2 Amt (g) | EX-3 Amt (g) | EX-4 Amt (g) | EX-5 Amt (g) | EX-6 Amt (g) |
|---|---|---|---|---|---|---|
| Phthalic anhydride | 85.90 | 385.69 | 208.18 | 260.94 | 259.52 | 195.01 |
| Adipic acid | 0 | 0 | 176.03 | 0 | 0 | 0 |
| Azelaic acid | 0 | 0 | 0 | 73.66 | 0 | 0 |
| Sebacic acid | 0 | 0 | 0 | 0 | 78.71 | 228.13 |
| Dibutytin bis-lauryl mercaptide | 0.50 | 0.50 | 0.50 | 0.50 | 0.50 | 0.50 |
| Biobased Content wt % | 27 | 27 | 47 | 34 | 36 | 53 |
| Wt % Renewable Content of starting material | 37 | 38 | 56 | 45 | 45 | 59 |
| Tg Differential Scanning Calorimetry (DSC) | 25° C. | 3° C. | −22° C. | −9° C. | −10° C. | 29° C. |

In another embodiment, the polyester resin is crystalline and comprises a Tg below about 25° C. and a crystalline melting temperature Tm greater than about 25° C. In yet another embodiment, the polyester resin has a Tg at or below about 25° C. and a Tm between about 25° C. and about 200° C. Table 3 shows some examples of polyester resins having a Tg at or below about 25° C. and Tm above about 25° C. Tg and Tm were determined by standard Differential Scanning calorimetry (DSC) techniques. The polyester compositions include modifying essentially 100% renewable aliphatic polyester resin by the addition of an amount of aromatic diacid, such as terephthalic acid, to help control crystalline regions and Tm. Example 3 describes tile flooring comprising blends of polyester resins, including a commercially available polyester resin, Ecoflex FBX7011, sold by BASF Plastics. Ecoflex FBX7011 is a high molecular weight, biodegradable, aliphatic-aromatic copolyester based on butanediol, adipic acid, and terephthalic acid exhibiting a Tg of about −25° C. and a Tm of about 115° C.

The blend of polyester resins allow processing in low intensity mixers typically used for VCT Tile manufacturing. Also, a desired Tg can be obtained by blending two or more polyester resins.

The polyester resin may be prepared by several known methods. One method involves esterification of a diacid and a diol components at elevated temperature. Typically, an excess of diol is employed (see Procedure 1A). After the acid functional groups have essentially reacted, a high vacuum is applied and excess diol is stripped off during transesterification, thereby increasing molecular weight. In some embodiments, 1,3-PDO is the diol of choice to build high molecular weight in this step of the process.

We have also found that polyester resin can be made by esterification of a diacid and diol at elevated temperature using an excess of diacid (See Procedure 1B). After all the hydroxyl groups are reacted, a high vacuum is applied to build molecular weight. The mechanism by which high molecular weight is achieved is not clear. Table 4 shows some examples of polyester resins comprising renewable components and the number average molecular weights obtained from the processes of Procedure 1.

Another method for obtaining high molecular weight polyester resin involves the co-reaction of a renewable polyester resin with recycle polyester resin such as PET (polyethylene terephthalate), PBT (polybutylene terephthalate), PPT (polypropylene terephthalate) or other polyester resins. In these co-reactions, an aliphatic polyester resin comprising renewable ingredients was first prepared as described in Procedure 1. The recycle polyester resin was then mixed with the aliphatic polyester resin and transesterification between the two polyesters was accomplished at high temperature and preferably under high vacuum. In one embodiment, the polyester resin co-reaction product had a Tm at or below about 150° C. that allowed processing with in low intensity mixers. It is obvious that these transesterification reactions may be carried out on virgin PET, PPT or PBT resin if desired.

TABLE 3

Compositions of Crystalline Polyesters With Renewable Content

| Ingredient | EX-7 Amt (g) | EX-8 Amt (g) | EX-9 Amt (g) | EX-10 Amt (g) | EX-11 Amt (g) | EX-12 Amt (g) | EX-13 Amt (g) |
|---|---|---|---|---|---|---|---|
| Glycerin | 25 | | | | | 24 | |
| Phthalic anhydride | | | 62 | 67 | 387 | | |
| 1,3-propanediol | 510 | 238 | 138 | 258 | 241 | 228 | 334 |
| Trimellitic anhydride | | | | | 122 | | |
| Sebacic acid | 1130 | 281 | | | | 538 | |
| Isophthalic acid | | | | | | | 765 |
| Terephthalic acid | 232 | 231 | 394 | 425 | | 110 | |
| 1,6-Hexanediol | | | 156 | | | | |
| T-20 Catalyst | 3.8 | 1.8 | 1.5 | 1.5 | 1.5 | 1.8 | 0.5 |
| Tg ° C. | −21 | −35 | 7 | 25 | 22 | −41 | 2 |
| Tm ° C. | 122 | 125 | 135 | 197 | 77 | 40 | 141 |
| Wt % Renewable Content of starting material | 88 | 69 | 18 | 34 | 32 | 85 | 33 |
| Biobased Content wt % | 85 | 67 | 13 | 27 | 26 | 87 | 27 |

TABLE 4

High Molecular Weight Polyester Compositions Having Renewable Content

| Ingredient | EX-14 | EX-7 | EX-12 | EX-15 | EX-16 | EX-17 | EX-18 |
|---|---|---|---|---|---|---|---|
| Glycerin | | 25 | 24 | | 1.53 | 1.53 | |
| Phthalic anhydride | 159 | | | 133 | 4 | | 91 |
| 1,3-Propanediol | 212 | 510 | 228 | 199 | 38 | 44 | 310 |
| Trimellitic acid | | | | | | | |
| Sebacic acid | 84 | 1130 | 538 | 155 | 40 | 51 | 87 |
| Isophthalic acid | 416 | | | 347 | | | 508 |
| Terephthalic acid | | 232 | 110 | | 50 | 42 | |
| Neopentyl glycol | 124 | | | | 2 | | |
| Cyclohexane dimethanol | | | | 161 | | | |
| 1,6-Hexanediol | | | | | 9 | | |
| T-20 Catalyst | 5 | 3.8 | 1.8 | 5 | 0.4 | 0.4 | 5 |
| Molecular Weight, Mn | 16,900 | 15,900 | 10,400 | 8,000 | 8,490 | 7,530 | 7,000 |

Molecular weight of the polyester resins were determined by Gel Permeation Chromatography (GPC) using the following procedure. The polyester resin was dissolved into tetrahydrofuran (THF), quantitatively diluting to ~30 mg/ml and filtering with a 0.45 micron filter. Two drops of toluene were added to each sample solution as an internal flow rate marker.

Samples soluble in THF were run by the following conditions. GPC analysis was run on the TriSec instrument using a four column bank of columns with pore sizes: HP, 2 mixed D PLGel and 500 Angstroms. Three injections were made for the sample and calibration standards for statistical purposes. Universal Calibration (UC) GPC was used to determine MW. UC is a GPC technique that combines Refractive Index (RI) detection (conventional GPC) with Intrinsic Viscometry (IV) detection. Advantages of UC over conventional GPC are:

1. MW is absolute (not relative only to standards)
2. Yields information about branching of molecules The mobile phase for the TI-IF soluble samples was THF at 1.0 ml/min. The data was processed using the Viscotek OmniSec UC software. The instrument is calibrated using a series of polystyrene narrow standards. To verify calibration, secondary standards were run. They include a 250,000 MW polystyrene broad standard, and a 90,000 MW PVC resin. The calculated molecular weight averages are defined as follows:

$$\bullet M_n = \frac{\sum (Area_i)}{\sum (Area_i)/(M_i)}$$

$$\bullet M_w = \frac{\sum [(Area_i) \times (M_i)]}{\sum (Area_i)}$$

$$\bullet M_z = \frac{\sum [(Area_i)^2 \times (M_i)]}{\sum [(Area_i) \times (M_i)]}$$

$Area_i$ = The area of the $i^{th}$ slice of polymer distribution
$M_i$ = The molecular weight of the $i^{th}$ slice of polymer distribution
Polydispersity (Pd) = a number value used to describe the molecular weight distribution and is obtained by $\frac{M_w}{M_n}$ Highly crystalline or some high molecular weight samples insoluble in THF were dissolved in a 50/50 (wt.) mixture of tetrachloroethylene (TTCE)/phenol. The column set is $10^4$ and 500 Angstrom 50 cm Jordi columns. The mobile phase was 50/50 (wt.) mixture of TTCE/phenol at 0.3 flow rate. The slower flow rate is due to the greater back pressure of the solvent system on the columns. The data was processed using the Viscotek UC OmniSec software.

Since MW data must be compared from one column set to the other, standards and selected samples were run on both column sets in THF for comparison. A calibration curve was made for each column set. There is good agreement of the standards between the two sets.

Flooring products having at least one layer comprising thermoplastic polyester resin binder may be manufactured by processing methods known in the art, including but not limited to calendering, extruding, casting, consolidating, and laminating. In one embodiment, a formulation comprising the polyester resin binder was melt mixed using low intensity "dough type" mixers traditionally utilized in the manufacturing of VCT tile (See Example 3). In another embodiment, the temperature of the melt mixing in the low intensity "dough type" mixers was in the range typically used in the manufacture of PVC based VCT Tile. In yet another embodiment, the formulation comprising the polyester resin binder was melt mixed using traditional extruder type mixers, including Farrell type mixers. These may be processed at higher temperatures than typically utilized in "dough type" mixers for the preparation of PVC based VCT Tile. Varied techniques may be utilized to form these melt mixed formulations into layers of flooring products. In one embodiment, the melt mixed formulation comprising the polyester resin binder was calendered into a layer. In another embodiment, the melt mixed formulation may be processed into chips or particles. Various techniques for consolidating these chips or particles into flooring layers are well known in the art. In another embodiment, the melt mixed formulation may be extruded into a flooring layer.

Procedure 1 Procedure for Preparation of High Molecular Weight Polyesters from Diacids and Diols 1A: This describes the general procedure utilized to make thermoplastic, high molecular weight polyesters from diacids and diols. A desired polyester formulation was developed based upon mole equivalent weight of the diacid and diol functional groups. An excess of diol of the most volatile dial component of the formulation was employed in the formulation. In one embodiment, 1,3-propanediol was the excess dial of choice. The diacid and dial ingredients were added into a stainless steel vessel of a RC1 automated reactor (Mettler-Toledo Inc, 1900 Polaris Parkway, Columbus, Ohio), stirred and heated under a continuous flow of pure, dry nitrogen. Typically, the ingredients were heated to 200° C. for 2 hours and temperature increased to 230° C. for an additional 4 to 6 hours until essentially all acid end groups were reacted and theoretical amount of water removed. Subsequently, the nitrogen was stopped and a high vacuum was applied. The mixture was heat and stirred wider high vacuum for an additional 4 or more hours at 230° C. to 300° C. in some cases the temperature of the transesterification step was increased to 0° C. or higher. Depending upon the experiment, a vacuum in the range of 5 mm of mercury was utilized. Subsequently, the polymer was allowed to cool to 150° C. to 200° C. and physically removed from the reactor under a flow of nitrogen and allowed to cool to room temperature.

It is understood that removal of the volatile diol component during transesterification leads to high molecular weight. High molecular weight may be obtained faster if higher vacuum is utilized (below 1 mm of mercury). It is also known that as the melt viscosity increases due to increased molecular weight, the removal of diol becomes more difficult. The increase in molecular weight can become diffusion dependent because of the high viscosity of the molten polyester. This means that the released volatile diol from the transesterification reaction reacts back into the polymer before it can diffuse out of the melt, and be removed. Renewing the surface of the melt can facilitate the loss of diol and increase molecular weight. The polyesters obtained by this procedure generally have terminal hydroxyl end groups.

Although, diacid components are described above, it is understood that their simple diesters such as from methanol or ethanol can be used to prepare the thermoplastic polyester resin via known transesterification techniques. The polyesters from this procedure generally have ester terminated end groups.

1B: The same general procedure as in 1A is employed. A desired polyester formulation was developed based upon mole equivalent weight of the diacid and diol functional groups. An excess of about 0.01 to 0.5 mole excess of diacid was typically employed in the formulation. The ingredients were mixed and heated as in 1A above, except that the temperature was generally held below 200° C. to keep acid/anhydride from being removed until all hydroxyl groups were reacted. Subsequently, a high vacuum was applied as in 1A and the mixture heated to between 230° C. and 280° C. and stirred as in Procedure 1A. The resultant high molecular weight polyester was removed from the reactor and cooled as in 1A.

The mechanism of achieving high molecular weight is not clear. In some formulations containing phthalic anhydride, the phthalic anhydride was identified as being removed from the mixture. Using a nitrogen sparge below the surface of the molten polyester during the vacuum step also helped produce high molecular weight polyesters. The polyesters obtained by this procedure generally have terminal acid end groups.

Tables 5A to 5E provide examples of polyester resins having, renewable components made according to the procedure of Procedure 1.

TABLE 5A

| Raw Material Ingredient | EX-19 Amt (g) | EX-20 Amt (g) | EX-21 Amt (g) | EX-22 Amt (g) | EX-23 Amt (g) | EX-24 Amt (g) |
|---|---|---|---|---|---|---|
| 1,3-Propanediol | 380.88 | 383.65 | 378.15 | 382.15 | 384.72 | 375.80 |
| Isophthalic acid | 232.94 | 167.59 | 297.34 | 210.34 | 164.70 | 206.85 |
| Phthalic anhydride | 385.69 | 448.26 | 324.01 | 348.28 | 272.71 | 342.49 |
| Trimellitic anhydride | 0.00 | 0.00 | 0.00 | 0.00 | 0.00 | 0.00 |
| Adipic acid | 0 | 0 | 0 | 58.73 | 177.38 | 0.00 |

TABLE 5A-continued

| Raw Material Ingredient | EX-19 Amt (g) | EX-20 Amt (g) | EX-21 Amt (g) | EX-22 Amt (g) | EX-23 Amt (g) | EX-24 Amt (g) |
|---|---|---|---|---|---|---|
| Azelaic acid | 0 | 0 | 0 | 0 | 0 | 74.37 |
| T-20 | 0.50 | 0.50 | 0.50 | 0.50 | 0.50 | 0.50 |
| Tg (° C.) | −1° C. | −5° C. | 22° C. | −11° C. | −23° C. | 4° C. |

TABLE 5B

| Raw Material Ingredient | EX-25 Amt (g) | EX-26 Amt (g) | EX-27 Amt (g) | EX-28 Amt (g) |
|---|---|---|---|---|
| 1,3-Propanediol | 366.04 | 373.73 | 360.20 | 261.06 |
| Neopentyl glycol | 0 | 0 | 0 | 112.82 |
| Isophthalic acid | 156.70 | 205.71 | 154.20 | 294.12 |
| Phthalic anhydride | 259.46 | 340.60 | 255.33 | 112.38 |
| Azelaic acid | 217 | 0 | 0 | 0 |
| Sebacic acid | 0 | 79.47 | 229.77 | 219.12 |
| T-20 | 0.50 | 0.50 | 0.50 | 0.50 |
| Tg (° C.) | −12° C. | −12° C. | −29° C. | −21° C. |

TABLE 5C

| Raw Material Ingredient | EX-29 Amt (g) | EX-30 Amt (g) | EX-31 Amt (g) | EX-32 Amt (g) | EX-33 Amt (g) |
|---|---|---|---|---|---|
| 1,3-Propanediol | 481.32 | 247.27 | 449.21 | 410.46 | 303.48 |
| Isophthalic acid | 0 | 0 | 0 | 0 | 696.01 |
| Phthalic anhydride | 198.83 | 481.53 | 211.15 | 639.45 | 0 |
| Trimellitic anhydride | 319.35 | 270.70 | 339.15 | 449.34 | 0 |
| T-20 | 0.50 | 0.50 | 0.50 | 0.50 | 0.50 |
| Tg (° C.) | 25° C. | −22° C. | −11° C. | 21° C. | 35° C. |

TABLE 5D

| Raw Material Ingredient | EX-34 Amt (g) | EX-35 Amt (g) | EX-36 Amt (g) | EX-37 Amt (g) | EX-38 Amt (g) | EX-39 Amt (g) |
|---|---|---|---|---|---|---|
| 1,3-Propanediol | 311.32 | 147.21 | 210.67 | 86.45 | 344.66 | 161.58 |
| Neopentyl glycol | | 201.45 | 123.55 | 276.04 | 0 | 223.72 |
| Isophthalic acid | 475.99 | 450.16 | 460.15 | 440.6 | 385.09 | 361.07 |
| Phthalic anhydride | 212.19 | 200.68 | 205.12 | 196.41 | 269.76 | 252.93 |
| T-20 | 0.50 | 0.50 | 0.50 | 0.50 | 0.50 | 0.50 |
| Tg (° C.) | 32° C. | 35° C. | 41° C. | 42° C. | 46° C. | 56° C. |

TABLE 5E

| Ingredient | EX-40 Amt (g) | EX-41 Amt (g) |
|---|---|---|
| 1,3-Propanediol | 211.61 | 200.93 |
| Neopentyl glycol | 124.10 | 0 |
| 1,4-Cyclohexanedimethanol | 0 | 163.15 |
| Isophthalic acid | 415.99 | 394.98 |
| Phthalic anhydride | 158.95 | 150.92 |
| Sebacic acid | 84.37 | 80.10 |
| T-20 | 10.00 | 9.90 |
| Tg (° C.) | 26° C. | 34° C. |

Example 2

Preparation of High Molecular Weight Polyesters by Co-Reaction with Recycle Crystalline Polyesters The following formulation was processed as per Procedure 1 to prepare the aliphatic polyester Ex-42 comprising 100% renewable components and a Biobased Content of 100%.

|  | EX-42<br>Amt (g) |
| --- | --- |
| 1,4-Butanediol | 400.5 |
| Sebacic acid | 600 |
| T-20 Catalyst | 0.4 |

The aliphatic polyester Ex-42 was mixed with clear PET bottle recycle resin obtained from Nicos Polymers & Grinding of Nazareth. Pa., and catalyst added as listed below.

|  | EX-43<br>Amt (g) |
| --- | --- |
| PET recycle bottle | 100 |
| EX-42 | 100 |
| T-20 Catalyst | 0.13 |

The mixture was heated and stirred under nitrogen at 265.degree. C. for a period of about 3 hours, and a high vacuum applied as in Procedure 1 for an additional 3 hours at 265.degree. C. Subsequently, the resultant polyester having 50% by weight renewable content and 50% by weight recycle content was shown to have a molecular weight Mn of 17,200 with a Tg of −9.degree. C. and a Tm of 114.degree. C. Molecular weight Mn of the starting PET recycle bottle resin was determined by GPC techniques described above and found to be 14,000. A sample of PET film obtained from Nicos Polymers R. Grinding was also analyzed by GPC and molecular weight Mn determined to be 17,300.

Example 3

Preparation of Vinyl Composition Type Tile Having a Binder Comprising Thermoplastic, High Molecular Weight Polyester Resin This is an example of PCT tile flooring product prepared with a binder comprising a thermoplastic, high molecular weight polyester resin. Traditionally, VCT the manufacturing processes have utilized low intensity "dough" type heated mixers to compound/melt mix the tile formulation which is subsequently calendered into a layer. Higher intensity mixers such as extruders or Farrell type mixers may also be employed, and these high intensity mixers may also be heated to higher temperatures to compound the tile formulation.

The following PCT tile formulations Table 6B-D, comprising amorphous, polyester resins GPa02176—of Table 5C and 5D, were mixed using a low intensity Baker Perkins heated mixer. The ingredients were added to the mixer which was heated to 325.degree. F. The formulations were mixed and heated for approximately 7-11 minutes on average in the Baker Perkins mixer to a drop temperature of approximately 280.degree. F. Depending upon the formulation, mixing time varied between 7-28 minutes and drop temperature varied between approximately 270.degree. F. and 290.degree. F. (See Table 6B-D).

The hot, mixed formulations were then dropped into the nip of a two roll calender. The rolls of the calendar were set at different temperatures—one roll hotter than the other. Typically, the hot roll was set at about 290.degree. F. and the cold roll set at about 250.degree. F. The nip opening between the calendar mill rolls were set to provide a final sheet thickness of about 125 mils. The processability of the formulations were evaluated using the key described in Table 6A.

TABLE 6A

Key for Baker Perkins and Mill Evaluations

Mix Appearance 1. very soft, wet, flowable mix
2. tough mix, dough like
3. soft mix, small beads
4. dry mix with some clumps
5. very dry powdery mix, no clumps
6. unmelted pellets/polyester Sheet Appearance 1. soft flexible sheet
2. smooth sheet
3. cracks in sheet and/or voids
4. ragged edges, uneven sheet thickness, wavy
5. lots of folds from being taken off with the blade Sheet Hot Strength 1. falls apart when removed from roll, powder
2. falls apart when removed from roll, small pieces of partial sheet
3. full sheet which falls apart under sheet weight
4. no stretch under sheet weight
5. slight stretch under sheet weight
6. sheet shrinks when pulled off the mill Roll Tack 1. sticks to a roll, all can't be removed with the blade
2. sticks to a roll, removed with blade but not cleanly (chatter marks)
3. sticks to a roll, removed cleanly with the blade
4. material split between two rolls
5. material does not stick to either roll Roll Residue 1. a lot
2. a little
3. none Self Feeding 1. yes
2. marginal
3. no As can be seen from a formulation and processing datasheet Tables 6B-6D, the formulation based upon high molecular weight polyesters processed very similar to a standard PVC formulations. Formulations of Tables 6B-6D are based on blends of Armstrong amorphous polyesters of Tables 5C-5D with Ecoflex FBX7011 polyester sold by BASF. Eroflex FBX7011 is a high molecular weight, biodegradable aliphatic-aromatic copolyester based on butanediol, adipic acid, and terephthalic acid exhibiting a Tg of about −25.degree. C. and a Tm of about 115.degree. C. The tiles exhibited acceptable physical properties, with a significant improvement in breaking load strength.

It is important to note that formulations based only on Ecoflex FBX7011 in pellet form could not be adequately mixed in the low intensity mixer. There was not enough heat transfer and shear within the mix to breakdown the pellet form of the Ecoflex 7011. The addition of the amorphous polyester resin changed the physical nature of the mix allowing the Ecoflex 7011 to be incorporated.

Tile and sheet formulations may also contain other ingredients such as processing aids, tackifiers, hydrophobic agents, stabilizers, colorants and other known additives. Of particular interest, the formulations may also contain up to 30% by weight of one or more additional polymers and sheet formulations may also contain up to 50% by weight of one or more additional polymers. These additional polymers may assist in processing in low intensity mixers, and also may assist in achieving improved physical properties. These polymers may consist of acid functionalized polymers including EAA, EMA, and partially neutralized versions thereof (ionomers), Surlyn, or other (methacrylic) acrylic acid, or maleic acid (anhydride) copolymers to obtain desired process and physical properties.

The use of recycle fillers in these formulations also allows for the flooring product having at least one layer comprising the high molecular weight polyester binder to achieve at least one point within the LEED System.

TABLE 6B

| Ingredient | Trade Name | Supplier | EX-44 Amt (g) | EX-45 Amt (g) | EX-46 Amt (g) | EX-47 Amt (g) | EX-48 Amt (g) |
|---|---|---|---|---|---|---|---|
| ESO | Flexol EPO | Dow | 7.6 | 14.32 | 6.13 | 11.55 | 6.13 |
| Filler (Limestone) | Global stone 229 | PenRoc | 926.2 | 926.2 | 924.74 | 924.74 | 924.74 |
| Pigment (TiO2) | Kronos 2220 | Kronos | 6.6 | 6.6 | 6.6 | 6.6 | 6.6 |
| Aromatic Polyester | Ecoflex FBX7011 | BASF | 83.6 | 83.6 | 101.2 | 101.2 | 101.2 |
| Aromatic Polyester | EX-30 | Armstrong | 76 | 69.28 | 61.33 | 55.91 | 0 |
| Aromatic Polyester | EX-32 | Armstrong | 0 | 0 | 0 | 0 | 61.33 |
| | Total | | 1100 | 1100 | 1100 | 1100 | 1100 |
| | Wt % Binder | | 0.15 | 0.15 | 0.15 | 0.15 | 0.15 |
| | Wt % Filled | | 0.85 | 0.85 | 0.85 | 0.85 | 0.85 |
| | Mixer Temp ° F. | | 324 | 324 | 324 | 324 | 324 |
| | Batch Time (min) | | 12 | 11 | 9 | 9 | 7 |
| | Mix Drop Temp F. | | 275 | 272 | 278 | 279 | 280 |
| | East Roll Temp F. | | 290 | 290 | 290 | 290 | 290 |
| | West Roll Temp F. | | 250 | 250 | 250 | 250 | 250 |
| | Gap Setting | | 2.1 | 2.1 | 2.1 | 2.1 | 2.1 |
| | Sheet Thickness | | 125 | 125 | 125 | 125 | 125 |
| | Mix Appearance | | 2--3 | 2--3 | 2--3 | 2--3 | 2--3 |
| | Sheet Appearance | | 2 | 2 | 2--4 | 2 | 3 |
| | Sheet Hot Strength | | 4 | 4 | 5 | 5 | 5 |
| | Roll Tack | | 2--3 | 3 | 2--3 | 3 | 3 |
| | Roll Residue | | 2 | 2 | 2 | 2 | 2 |
| | Self Feeding | | 1 | 1 | 1 | 1 | 1 |

TABLE 6C

| Ingredient | Trade Name | Supplier | EX-49 Amt (g) | EX-50 Amt (g) | EX-51 Amt (g) | EX-52 Amt (g) |
|---|---|---|---|---|---|---|
| ESO | Flexol EPO | Dow | 11.55 | 0 | | 0 |
| Filler (Limestone) | Global stone 229 | PenRoc | 924.74 | 923.77 | 926.2 | 924.74 |
| Pigment (TiO2) | Kronos 2220 | Kronos | 6.6 | 6.6 | 6.6 | 6.6 |
| Aromatic Polyester | Ecoflex FBX7011 | BASF | 101.2 | 127.22 | 83.6 | 101.2 |
| Aromatic Polyester | EX-32 | Armstrong | 55.91 | 0 | 0 | 0 |
| Aromatic Polyester | EX-33 | Armstrong | 0 | 42.41 | 83.6 | 67.47 |
| | Total | | 1100 | 1100 | 1100 | 1100 |
| | Wt % Binder | | 0.15 | 0.15 | 0.15 | 0.15 |
| | Wt % Filled | | 0.85 | 0.85 | 0.85 | 0.85 |
| | Mixer Temp ° F. | | 324 | 324 | 324 | 324 |
| | Batch Time (min) | | 15 | 15 | 15 | 10 |
| | Mix Drop Temp F. | | 283 | 279 | 279 | 278 |
| | East Roll Set Pressure psi | | 78 | 78 | 78 | 78 |
| | West Roll Set Pressure psi | | 26 | 26 | 26 | 26 |
| | East Roll Temp F. | | 290 | 290 | 290 | 290 |
| | West Roll Temp F. | | 250 | 250 | 250 | 250 |
| | Gap Setting | | 2.1 | 2.1 | 2.1 | 2.0 |
| | Sheet Thickness | | 125 | 125 | 125 | 125 |
| | Mix Appearance | | 2 | 2 | 2 | 2 |
| | Sheet | | 2 | 2 | 2 | 2 |

TABLE 6C-continued

| Ingredient | Trade Name | Supplier | EX-49 Amt (g) | EX-50 Amt (g) | EX-51 Amt (g) | EX-52 Amt (g) |
|---|---|---|---|---|---|---|
| | Appearance | | | | | |
| | Sheet Hot Strength | | 5 | 5 | 5 | 4 |
| | Roll Tack | | 3 | 3 | 3 | 3 |
| | Roll Residue | | 2 | 2 | 2 | 2 |
| | Self Feeding | | 2 | 2 | 2 | 2 |

TABLE 6D

| Ingredient | Trade Name | Supplier | EX-53 Amt (g) | EX-54 Amt (g) | EX-55 Amt (g) | EX-56 Amt (g) | EX-57 Amt (g) |
|---|---|---|---|---|---|---|---|
| Filler (Limestone) | Global stone 229 | PenRoc | 961.08 | 926.20 | 924.74 | 926.20 | 924.74 |
| Pigment (TiO2) | Kronos 2220 | Kronos | 6.60 | 6.60 | 6.60 | 6.60 | 6.60 |
| Aromatic Polyester | Ecoflex FBX7011 | BASF | 79.39 | 83.60 | 101.20 | 83.60 | 101.20 |
| Aromatic Polyester | EX-34 | Armstrong | 52.93 | 0.00 | 0.00 | 0.00 | 0.00 |
| Aromatic Polyester | EX-35 | Armstrong | 0.00 | 83.60 | 67.47 | 0.00 | 0.00 |
| Aromatic Polyester | EX-36 | Armstrong | 0.00 | 0.00 | 0.00 | 83.60 | 0.00 |
| Aromatic Polyester | EX-37 | Armstrong | 0.00 | 0.00 | 0.00 | 0.00 | 67.47 |
| | Total | | 1100 | 1100 | 1100 | 1100 | 1100 |
| | Wt % Binder | | 0.15 | 0.15 | 0.15 | 0.15 | 0.15 |
| | Wt % Filled | | 0.88 | 0.85 | 0.85 | 0.85 | 0.85 |
| | Mixer Temp ° F. | | 324 | 324.00 | 324.00 | 324.00 | 324 |
| | Batch Time (min) | | 28 | 12 | 11 | 13 | 8 |
| | Mix Drop Temp ° F. | | 288 | 274 | 272 | 278 | 288 |
| | East Roll Set Pressure psi | | 78 | 78 | 78 | 78 | 78 |
| | West Roll Set Pressure psi | | 26 | 26 | 26 | 26 | 26 |
| | East Roll Temp ° F. | | 290 | 290 | 290 | 290 | 290 |
| | West Roll Temp ° F. | | 250 | 250 | 250 | 250 | 250 |
| | Gap Setting | | 2.1 | 2.1 | 2.1 | 2.1 | 2.0 |
| | Sheet Appearance | | 2 | 2 | 2 | 2 | 2 |
| | Mix Appearance | | 3 | 2--3 | 2--3 | 2--3 | 2--3 |
| | Sheet Thickness | | 124 | 124 | 122 | 124 | 124 |
| | Sheet Hot Strength | | 5 | 4 | 4 | 4 | 5 |
| | Roll Tack | | 3 | 3 | 3 | 3 | 3 |
| | Roll Residue | | 2 | 2 | 2 | 2 | 2 |
| | Self Feeding | | 1 | 1 | 2 | 2 | 1 |

Example 4

Preparation of Vinyl Composition Type Tile flaying a Binder Comprising Thermoplastic, High Molecular Weight Polyester Resin High molecular weight polyester of the composition in table 5E was prepared as per Procedure 1. The high molecular weight polyester was formulated into a PCT tile formulation and processed as in Example 3. The datasheet Table 7 describes the conditions used to make the tile. The tile exhibited acceptable physical properties, with a significant improvement in breaking load strength.

TABLE 7

| Ingredient | Trade Name | Supplier | EX-58 Amt (g) | EX-59 Amt (g) |
|---|---|---|---|---|
| Filler (Limestone) | Global stone 229 | PenRoc | 880.00 | 880.00 |
| Pigment (TiO2) | Kronos 2220 | Kronos | 6.00 | 6.00 |
| Aromatic Polyester | Ecoflex FBX7011 | BASF | 114.00 | 0 |
| Aromatic Polyester | EX-40 | Armstrong | 0 | 114.00 |

TABLE 7-continued

| Ingredient | Trade Name | Supplier | EX-58 Amt (g) | EX-59 Amt (g) |
|---|---|---|---|---|
| Aromatic Polyester | EX-41 | Armstrong | 0 | 42.41 |
| | Total | | 1000.00 | 1000.00 |
| | Wt % Binder | | 11.40% | 11.40% |
| | Wt % Filled | | 88.60% | 88.60% |
| | Mixer Temp ° F. | | 326 | 327 |
| | Batch Time (min) | | 30 | 20 |
| | Mix Drop Temp ° F. | | 284 | 278 |
| | East Roll Set Pressure psi | | 77 | 72 |
| | West Roll Set Pressure psi | | 30 | 30 |
| | East Roll Temp ° F. | | 292 | 290 |
| | West Roll Temp ° F. | | 252 | 248 |
| | Gap Setting | | 2.1 | 2.0 |
| | Sheet Appearance | | 2 | 2 |
| | Mix Appearance | | 2.3 | 2.3 |
| | Sheet Thickness | | 124 | 121 |
| | Sheet Hot Strength | | 4 | 4 |
| | Roll Tack | | 3 | 3 |

TABLE 7-continued

| Ingredient | Trade Name | Supplier | EX-58 Amt (g) | EX-59 Amt (g) |
|---|---|---|---|---|
| | Roll Residue | | 3 | 3 |
| | Self Feeding | | 1 | 1 |

Example 5

Examples of Polyesters Made by Transesterification Between High Molecular Weight Aliphatic, Renewable Polyesters and Recycle Polyester Resin High molecular weight polyesters comprising the compositions of Table 8A were made according to Procedure 1.

TABLE 8A

| | Azelaic Acid Amt (g) | 1,4-Butanediol Amt (g) | Sebacic Acid Amt (g) | T-20 Amt (g) | Total Amt (g) |
|---|---|---|---|---|---|
| EX-60 | 511 | 489 | | 0.4 | 1000 |
| EX-61 | 582 | 417.6 | | 0.4 | 1000 |
| EX-62 | | 400.5 | 600 | 0.4 | 1001 |
| EX-63 | | 471.2 | 528 | 0.4 | 1000 |
| EX-42 | | 325.74 | | 0.5 | 1000 |
| EX-64 | | 354 | 529 | 0.4 | 883 |

The polyesters of Table 8A, were each mixed with recycle PET bottle resin obtained from Nicos Polymers & Grinding of Nazareth, Pa., and 0.1% T-20 catalyst added and transesterification conducted as per Example 2. In some examples, transesterification was also carried out on PBT resin Celanex 1600A obtained from Ticona (formerly Hoechst Celanese Corp.), Summit, N.J. Table 8B shows some of the resultant polyester co-reaction products and their Tm. It is obvious that these transesterification reactions may be carried out on virgin PET or PBT type resin.

TABLE 8B

| PE Transesterification Rxn# | Polyester ID used in Transesterification Rxn | Recylced Bottle PET | PBT Celanex | PB Azelate | Ecoflex FBX7011 | PB Sebacate | melt range (deg C.) trans product | Midpoint Mp ™ ° C. |
|---|---|---|---|---|---|---|---|---|
| Nicos Scrap PET | | | | | | | 255-259 | 256 |
| EX-65 | EX-60 | 70 | | 30 | | | 138-154 | 145 |
| EX-66 | EX-61 | 50 | | 50 | | | 84.5-104.8 | 94.9 |
| EX-67 | EX-61 | 70 | | 30 | | | 140-159 | 146 |
| EX-68 | EX-62 | 50 | | | | 50 | 99-126 | 102.9 |
| EX-69 | EX-62 | 70 | | | | 30 | 155-170 | 160 |
| EX-70 | EX-63 | 50 | | | | 50 | 101-125 | 109 |
| EX-71 | EX-63 | 70 | | | | 30 | 149-156 | 151 |
| EX-72 | EX-42 | 50 | | 50 | | | 100-111 | 105 |
| EX-73 | EX-42 | 70 | | 30 | | | 133-141 | 136 |
| EX-74 | EX-64 | 50 | | | | 50 | 92-106 | 97 |
| EX-75 | EX-65 | 70 | | | | 30 | 110-170 | 140 |
| EX-76 | EX-60 | | 75 | 75 | | | 135-141 | 137 |
| EX-77 | EX-64 | | 75 | | | 75 | 145-166 | 156 |
| EX-78 | EX-63 | 180 | | | | 120 | 79-153 | 87 |
| EX-79 | EX-42 | 180 | | 120 | | | 73-108 | 79 |
| EX-80 | Ecoflex FXB7011 | 180 | | | 120 | | 122-158 | 137 |

The melting points listed in Table 8B were determined using an "Optimelt" automated unit. Higher Tm co-reacted polyesters may be produced by using less aliphatic polyester than described in the Table 8B above.

Example 6

PCT Tile Compositions Comprising High Molecular Weight Polyester Binders of Example 5

Formulations based on the polyester reaction products of Table 8B were developed to allow processing in low shear Baker Perkins heated mixers and VCT type calendaring processing. The formulations in Table 8C and Table 8D include FAA (ethylene acrylic acid copolymer) and an acrylic processing aid. The use of FAA not only effect processing in the Baker Perkins and through the calendar, but the polymer also imparts stiffness and some improved properties.

TABLE 8C

| Ingredient | Trade Name | Supplier | EX-81 Amt (g) | EX-82 Amt (g) | EX-83 Amt (g) | EX-84 Amt (g) | EX-85 Amt (g) |
|---|---|---|---|---|---|---|---|
| Filler (Limestone) | Global stone 229 | PenRoc | 479.9 | 479.9 | 479.9 | 479.9 | 479.9 |
| Pigment (TiO2) | Kronos 2220 | Kronos | 3.4 | 3.4 | 3.4 | 3.4 | 3.4 |
| Aromatic Polyester | EX-66 | Armstrong | 65.0 | | | | |
| Aromatic Polyester | EX-68 | Armstrong | | 65.0 | | | |
| Aromatic Polyester | EX-70 | Armstrong | | | 65.0 | | |
| Aromatic Polyester | EX-72 | Armstrong | | | | 65.0 | |
| Aromatic Polyester | EX-74 | Armstrong | | | | | 65.0 |
| EAA | Primacor 1410 | Dow | 13 | 6.5 | 13 | 13 | 13 |
| Acrylic | Plasti-strength 530 | Arkema | 10 | | 10 | 10 | 10 |
| Total | | | 548.3 | 548.3 | 548.3 | 548.3 | 548.3 |
| Wt % Binder | | | | | | | |
| Wt % Filled | | | | | | | |
| Mixer Temp ° F. | | | 326 | 325 | 326 | 326 | 326 |
| Batch Time (min) | | | | 11 | 5 | 5 | 5 |
| Mix Drop Temp ° F. | | | 284 | 292 | 284 | 278 | 278 |
| East Roll Temp ° F. | | | 295 | 293 | 287 | 278 | 278 |
| West Roll Temp ° F. | | | 293 | 277 | 236 | 200 | 225 |
| Gap Setting | | | 0.71 | 6, 7 | 0.7 | 0.7 | 0.7 |
| Sheet Appearance | | | 2 | 2, 1 | 2 | 2 | 2 |
| Mix Appearance | | | 5 | 5 | 5 | 5 | 5 |
| Sheet Thickness | | | 75-80 | 55-65 | 75-80 | 75-80 | 75-80 |
| Sheet Hot Strength | | | 5 | 5 | 5 | 5 | 5 |
| Roll Tack | | | 3 | 2 | 3 | 3 | 3 |
| Roll Residue | | | 2 | 2 | 2 | 2 | 2 |
| Self Feeding | | | 2 | 2 | 1 | 1 | 1 |

TABLE 8D

| Ingredient | Trade Name | Supplier | EX-86 Amt (g) | EX-87 Amt (g) | EX-88 Amt (g) |
|---|---|---|---|---|---|
| Filler (Limestone) | Global stone 229 | PenRoc | 959.8 | 959.8 | 959.8 |
| Pigment (TiO2) | Kronos 2220 | Kronos | 6.8 | 6.8 | 6.8 |
| Aromatic Polyester | EX-78 | Armstrong | 130.0 | | |
| Aromatic Polyester | EX-79 | Armstrong | | 130.0 | |
| Aromatic Polyester | EX-68 | Armstrong | | | 130.0 |
| EAA | Primacor 1410 | Dow | 26 | 26 | 52 |
| Acrylic | Plasti-strength 530 | Arkema | 20 | 20 | 40 |
| Total | | | 1142.6 | 1142.6 | 1188.6 |
| Wt % Binder | | | | | |
| Wt % Filled | | | | | |
| Mixer Temp ° F. | | | 325 | 327 | 327 |
| Batch Time (min) | | | 26 | 30 | — |
| Mix Drop Temp ° F. | | | 278 | 278 | — |
| East Roll Temp ° F. | | | 225 | 232 | 297 |
| West Roll Temp ° F. | | | 225 | 235 | 292 |
| Gap Setting | | | 2 | 2 | 6.2, 4.2 |
| Sheet Appearance | | | 2 | 2 | 2 |
| Mix Appearance | | | 3 | 4, 3 | 3, 2 |
| Sheet Thickness | | | 120 | 123-128 | 125-134 |
| Sheet Hot Strength | | | 5 | 5 | 5 |
| Roll Tack | | | 3, 2 | 3, 2 | 3, 2 |
| Roll Residue | | | 2 | 2 | 2 |
| Self Feeding | | | 1 | 1 | 1 |

Example 7

PCT Tile Comprising High Molecular Weight Polyester Binder and Processing Additives A high molecular weight polyester comprising the composition in Table 9 was prepared as per Procedure 1.

TABLE 9A

| Ingredient | Supplier | Function | Ex-89 Amt (g) |
|---|---|---|---|
| Phthalic Anhydride | | acid | 495 |
| Trimellitic Anhydride | | acid | 47.6 |
| Neopenyl Glycol | | diol | 347.9 |
| 1,6 hexanediol | | diol | 109.6 |
| T-20 | Air Products | catalyst | 0.4 |
| Total | | | 1000.5 |

PCT the formulations based on the polyester of Table 9A were developed to allow processing in low shear Baker Perkins heated mixers and VCT type calendaring processing. The formulations in Table 9B include EAA (ethylene acrylic acid copolymer) and an acrylic processing aid. The use of FAA not only effect processing in the Baker Perkins and through the calendar, but the polymer also imparts stiffness and some improved properties.

TABLE 9B

| Ingredient | Trade Name | Supplier | Ex-90 Amt (g) | Ex-91 Amt (g) | Ex-92 Amt (g) |
|---|---|---|---|---|---|
| Filler (Limestone) | Global stone 229 | PenRoc | 768.0 | 768.0 | 768.0 |
| Filler (Limestone) | Emerys DB04 | | 192.0 | 192.0 | 192.0 |
| Pigment (TiO2) | Kronos 2220 | Kronos | 6.8 | 6.8 | 6.8 |
| Polyester | EX-63 | Armstrong | 100 | 80.0 | 65.0 |
| Ecoflex FBX7011 | | | 30 | 50 | 65 |
| EAA | Primacor 1410 | Dow | 26 | 26 | 26 |
| Acrylic | Plasti-strength 530 | Arkema | 20 | 20 | 20 |
| | | | | | |
| Total | | | 1142.8 | 1142.8 | 1142.8 |
| Mixer Temp ° F. | | | 327 | 327 | 327 |
| Batch Time (min) | | | 12 | 14 | 12 |
| Mix Drop Temp ° F. | | | 272 | 271 | 277 |
| East Roll Temp ° F. | | | 243 | 241 | 241 |
| West Roll Temp ° F. | | | 237 | 235 | 235 |
| Gap Setting | | | 2 | 2 | 2 |
| Sheet Appearance | | | 2 | 2 | 2 |
| Mix Appearance | | | 4 | 4 | 4 |
| Sheet Thickness | | | 130 | 128-130 | 128-130 |
| Sheet Hot Strength | | | 4 | 4 | 4 |
| Roll Tack | | | 3, 2 | 3, 2 | 3, 2 |
| Roll Residue | | | 2 | 2 | 2 |
| Self Feeding | | | 1 | 1 | 1 |

The use of different sized limestone filler yields better processability and improved performance.

Example 8

PCT Tile Comprising High Molecular Weight Polyester and Process Additives

A high molecular weight polyester comprising the composition Table 10A was prepared according to Procedure 1.

TABLE 10A

| Ingredient | EX-93 Amt (g) |
|---|---|
| Sebacic acid | 279.11 |
| Terephthalic acid | 343.83 |
| Phthalic anhydride | 25.55 |
| 1,3-Propanediol | 262.55 |
| Glycerin | 10.59 |
| 1,6 Hexanediol | 61.16 |
| Neopentyl glycol | 10.76 |
| T-20 | 2.99 |
| | |
| Total | 996.54 |
| Tg | −16° C. |
| Tm | 113° C. |

PCT tile formulations based on the high molecular weight polyester of Table 10A were developed to allow processing in low shear Baker Perkins heated mixers and VCT type calendaring processing as per Example 3. The formulation datasheets in Table 10B include the use of a hydrocarbon tackifier, epoxidized soybean oil and Surlyn ionomer additives. Surlyn ionomer may not only effect processing in the Baker Perkins and through the calendar rolls, but Surlyn may also impart some improved properties to the finished tile. In cases where ESO or other epoxidized oils are also used in combination with acid functionalized polymers, these may react with each other (dynamic cross-linking) during processing of the formulation at elevated temperature.

TABLE 10B

| Ingredient | Trade Name | Supplier | Ex-90 Amt (g) | Ex-91 Amt (g) | Ex-92 Amt (g) |
|---|---|---|---|---|---|
| Pigment 348 | Kronos 2220 | Kronos | 5.5 | 5.5 | 5.5 |
| Limestone 229 | Marble Hill 40X0 | JM Huber Corp | 908.0 | 1008.0 | 958.0 |
| Polyester | EX-93 | Armstrong | 168.0 | 168.0 | 168.0 |
| Copal rosin | | | 15.0 | | |
| ESO | | Dow | 10.0 | 15.0 | 15.0 |
| Ethylene-methacrylic acid copolymer, Partial metal salt | Surlyn 8920 | Du Pont | | | 20.0 |
| | | | | | |
| Total | | | 1106.5 | 1196.5 | 1166.5 |
| Mixer Temp ° F. | | | 324 | 324 | 324 |
| Batch Time (min) | | | 13 | 13 | 13 |
| Mix Drop Temp ° F. | | | 282 | 284 | 284 |
| East Roll Temp ° F. | | | 280 | 280 | 288 |
| West Roll Temp ° F. | | | 255 | 255 | 255 |
| Gap Setting | | | 2.2 | 2.2 | 2 |
| Sheet Appearance | | | 1-2 | 1-2 | 2, 1 |
| Mix Appearance | | | 2/3 | 2/3 | 2/3 |

TABLE 10B-continued

| Ingredient | Trade Name | Supplier | Ex-90 Amt (g) | Ex-91 Amt (g) | Ex-92 Amt (g) |
|---|---|---|---|---|---|
| | Sheet Thickness | | 0.125 | 0.124 | 0.125 |
| | Sheet Hot Strength | | 5 | 5 | 5 |
| | Roll Tack | | 3 | 3 | 3 |
| | Roll Residue | | 2 | 2 | 3 |
| | Self Feeding | | 2 | 2 | 1 |

The invention claimed is:

1. A resilient flooring product comprising a base layer, the base layer comprising a polymeric binder and a filler, wherein the polymeric binder comprises at least one biobased thermoplastic polyester, and wherein the biobased thermoplastic polyester consists essentially of an amorphous polyester that is the reaction product of ingredients comprising an aliphatic diol component and an aromatic diacid component, wherein the thermoplastic polyester has a $T_g$ less than 25° C.

2. The resilient flooring product of claim 1, wherein the base layer further comprises a filler of a mineral, a thermoset resin or a thermoplastic resin.

3. The resilient flooring product of claim 1, wherein the aliphatic diol component is a biobased component.

4. The resilient flooring product of claim 1, wherein the base layer further comprises at least about 10% weight of a recycled material.

5. The resilient flooring product of claim 1, wherein the base layer further comprises a second polyester comprising an aliphatic diol component, an aliphatic diacid component and an aromatic diacid component.

6. The resilient flooring product of claim 3, wherein the aliphatic diol is 1,3-propanediol or 1,4-butanediol.

7. The resilient flooring product of claim 1, wherein the aromatic diacid is selected from phthalic acid, phthalic anhydride, isophthalic acid, and terephthalic acid.

8. The resilient flooring product of claim 5, wherein the aliphatic diacid is sebacic acid, succinic acid, adipic acid or azelaic acid.

9. A resilient flooring product comprising a base layer, the base layer comprising a polymeric binder and a filler, wherein the polymeric binder comprises at least one biobased thermoplastic polyester, and wherein the biobased thermoplastic polyester consists essentially of an amorphous polyester that is the reaction product of ingredients comprising an aliphatic diol component and an aromatic diacid component, wherein the thermoplastic polyester has a $T_g$ at about room temperature.

10. A resilient flooring product comprising a base layer, the base layer comprising a polymeric binder and a filler, wherein the polymeric binder comprises a biobased polyester, and wherein the biobased polyester consists essentially of an amorphous polyester that is the reaction product of ingredients comprising an aliphatic diol component and an aromatic diacid component, wherein the amorphous polyester has a $T_g$ at about room temperature.

11. The resilient flooring product of claim 10, wherein the base layer further comprises a filler of a mineral, a thermoset resin or a thermoplastic resin.

12. The resilient flooring product of claim 10, wherein the aliphatic diol component is a biobased component.

13. The resilient flooring product of claim 10, wherein the base layer further comprises at least about 10% weight of a recycled material.

14. The resilient flooring product of claim 10, wherein the base layer further comprises a second polyester comprising an aliphatic diol component, an aliphatic diacid component and an aromatic diacid component.

15. The resilient flooring product of claim 12, wherein the aliphatic diol is 1,3-propanediol or 1,4-butanediol.

16. The resilient flooring product of claim 10, wherein the diacid is an aromatic diacid, which is selected from the group consisting of phthalic acid, phthalic anhydride, isophthalic acid, and terephthalic acid.

17. The resilient flooring product of claim 14, wherein the aliphatic diacid is sebacic acid, succinic acid, adipic acid or azelaic acid.

18. The resilient flooring product of claim 10, wherein the flooring product further comprises a crystalline polyester.

* * * * *